(12) United States Patent  
George et al.

(10) Patent No.: US 7,010,663 B2  
(45) Date of Patent: Mar. 7, 2006

(54) METHOD AND SYSTEM FOR DIVIDING A PLURALITY OF EXISTING VOLUMES OF STORAGE INTO A PLURALITY OF VIRTUAL LOGICAL UNITS OF STORAGE

(75) Inventors: Elizabeth George, Union City, CA (US); Sanjay B. Jagad, Fremont, CA (US); Chung-De Li, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 52 days.

(21) Appl. No.: 10/104,268

(22) Filed: Mar. 22, 2002

(65) Prior Publication Data

US 2003/0182501 A1   Sep. 25, 2003

(51) Int. Cl.  
*G06F 12/08* (2006.01)

(52) U.S. Cl. .......................... 711/209; 711/4
(58) Field of Classification Search ............... 711/209, 711/114, 4, 112; 709/223  
See application file for complete search history.

(56) References Cited

OTHER PUBLICATIONS

King, Bill, Lun Masking in a San, Oct. 08, 2001, QLogic Communications, INC.  
Tivoli Systems, Sans and Operating, Feb. 12, 2002, FC Focus Magazine Systems.

*Primary Examiner*—Gary Portka  
(74) *Attorney, Agent, or Firm*—Finnegan, Henderson, Farabow, Garrett & Dunner, L.L.P.

(57) ABSTRACT

A method and apparatus for increasing the number of storage units. Specifically, the present invention describes a method for creating a plurality of virtual logical units (LUN) of storage from a plurality of existing volumes of storage for access by a plurality of host applications via a virtualization layer. The virtual LUNs are created by partitioning the existing volumes into a plurality of slices. Each of the plurality of slices is then mapped to the plurality of virtual LUNs. Furthermore, each of the plurality of virtual LUNs is masked to each of the plurality of host applications to provide access control. The plurality of host applications are transparently interfaced to the existing volume while preserving the original configuration of internal operating code or intelligence for interfacing with the plurality of existing volumes.

35 Claims, 7 Drawing Sheets

LUN MASKING TABLE

| HOSTS | EXT. LUNS | SLICE | PERMISSION |
|---|---|---|---|
| H1 510 | LUN0 432 | S0 422 | READ/WRITE 530 |
|  | LUN1 434 | S1 424 | READ/WRITE 540 |
| H2 520 | LUN2 550 | S2 552 | READ/WRITE 554 |
|  | LUN3 560 | S3 562 | NONE 564 |
| ⋮ | ⋮ | ⋮ | ⋮ |

METHOD AND SYSTEM FOR DIVIDING A PLURALITY OF EXISTING VOLUMES OF STORAGE INTO A PLURALITY OF VIRTUAL LOGICAL UNITS OF STORAGE

BACKGROUND OF THE INVENTION

1. Field of the Invention

Embodiments of the present invention relate to the field of data storage systems. More particularly, embodiments of the present invention relate generally to the expansion of an existing data storage system into a plurality of virtual data storage systems.

2. Related Art

Data storage systems increasingly are becoming larger due to advances in technology. As a result, individual units of storage, (e.g., data disks) are increasing. However, storage systems designed for the smaller capacity storage units of the past many times are unable to efficiently use the increases in storage capacity.

For example, in the past, the internal operating code of some data storage systems recognized the organization of data disks into one or two volumes. As such, each of the volumes would correspond to a logical unit (LUN) of data storage, thereby creating a one to one relationship between a volume and a LUN. Typically, the LUN would be accessed by a dedicated host application to minimize the risk of losing data when reading and writing data to a LUN.

To increase the capacity of data storage, a finite number of LUNs could be coupled together in the data storage network. Various data storage networks could be coupled to provide a system area network (SAN) with data storage capabilities. In that way, a host application would not be limited to the size of a LUN for storing data within a data storage network. Also, other host applications could be assigned other individual LUNs within a data storage network for access and use.

Frequently, as LUN sizes have increased, a host application does not need to utilize the entire storage space of one particular LUN for a specific feature of the application. For example, the operating code, of the host application could be stored on portions of one LUN. Because of the sensitivity of the operating code, to maintain data security, that particular LUN would be dedicated to that particular host application. As such, other host applications within a particular data storage network would be denied access to that LUN so that they could not interfere with the operating code of the host application, data base of the host application, etc.

In that way, the host application itself could use the remaining portions of the LUN for data storage. The host application itself would partition out the LUN for storing various categories of data. Still, a particular host application may not utilize the entire storage space of a LUN, and, as such, that space could be available to other host applications. However, access by other host applications into specific areas of the LUN is not possible without coordinating software. Unfortunately, the internal operating code of a host application typically does not allow for any coordinating software that controls and monitors data control networks in support of other host applications.

To further compound the waste of useable storage space within a LUN, because of the limitations of the internal operating code of the data storage system as originally configured, each of the LUNs within a data storage network would necessarily be tied to a particular host application in order to protect data security. Allowing more than one host application to write to the same storage space without coordinating software will cause data loss. The internal operating code previously was unable to control access to various parts of the LUN. As such, if one part of the LUN was tightly controlled, then all parts of the LUN would have the same limitation. As a result, because of the finite nature of the number of LUNs that could be coupled within a single data storage network, there would be a finite number of host applications that could be supported by the data storage network.

One previous solution for controlling access to various parts of a volume of the data storage network associated with a LUN would be to partition out the volume into numerous smaller LUNs. In this way, to take advantage of the increasing volume sizes, multiple LUNs would be created from the same physical volume of data storage. However, this method requires the burdensome task of rewriting the internal operating code to recognize the increased numbers of LUNs within the data storage network. The codes needing to be rewritten include, but are not limited to the internal transfer code that coordinates the transfer of data, the monitoring code that monitors failures within the data storage system, and the driver code for coordinating communication between the data storage network and the host application.

SUMMARY OF THE INVENTION

Embodiments of the present invention disclose a method and system for increasing the number of logical units (LUNs) of storage within a storage device. Another embodiment of the present invention discloses a method and system for increasing the number of host applications that can access and use a storage device.

Specifically, one embodiment of the present invention describes a method for creating a plurality of virtual logical units (LUN) of storage from a plurality of existing volumes of a storage device. The plurality of virtual LUNs are accessed by a plurality of host applications and transparently interfaced with the plurality of existing volumes.

The virtual LUNs are created by partitioning the existing volumes into a plurality of slices. Each of the plurality of slices is then mapped to the plurality of virtual LUNs. Furthermore, each of the plurality of virtual LUNs is masked to each of the plurality of host applications to provide access control. Moreover, the plurality of host applications are transparently interfaced with the existing volumes via a virtualization software layer that interfaces with and preserves the originally configured internal intelligence (e.g., internal operating code) that accesses the plurality of volumes.

DETAILED DESCRIPTION OF THE INVENTION

Reference will now be made in detail to the preferred embodiments of the present invention, a method and system for translating one or more volumes of storage into a plurality of virtual logical units of storage, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "partitioning," "mapping," "masking," "calculating," "determining," "scrolling," "displaying," "recognizing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Volume Slicing and Logical Unit (LUN) Mapping and Masking

This disclosure describes a method and apparatus for slicing one or more volumes of storage into a plurality of virtual LUNs, thereby increasing the number of accessible LUNs within a data storage network. Also, another embodiment of the present invention discloses a method and system for increasing the number of host applications that can access and use a particular volume of storage.

Figure 1:
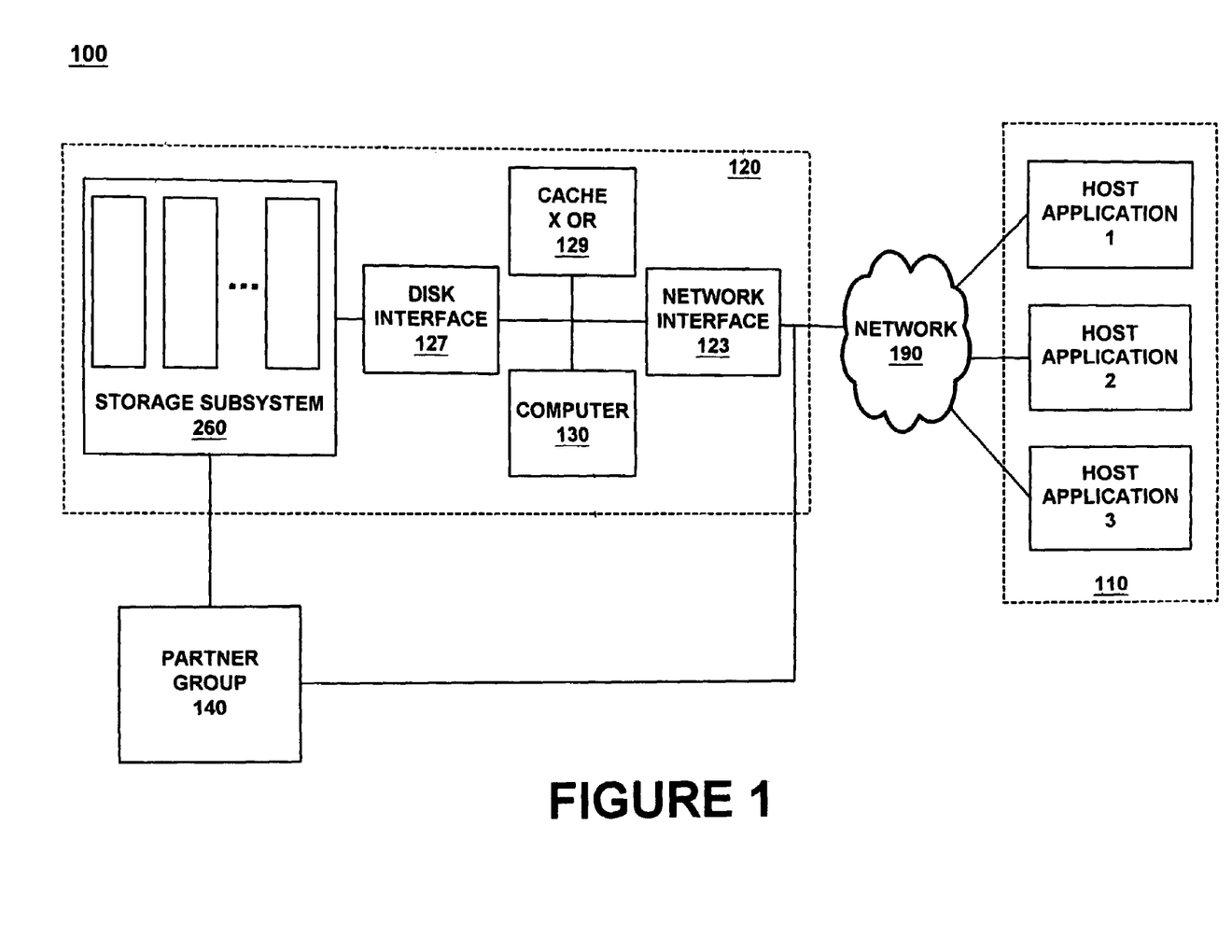
FIG. 1 is a block diagram of an exemplary communication network for providing interfacing between host applications and a storage device, in accordance with one embodiment of the present invention.

Referring to FIG. 1, embodiments of the present invention are implemented within a communication system 100. A plurality of host applications 110 communicates with a storage device 120 through a network 190. The plurality of host applications 110 can consist of any number of host applications including host applications 1, 2, and 3 of FIG. 1.

Figure 2:
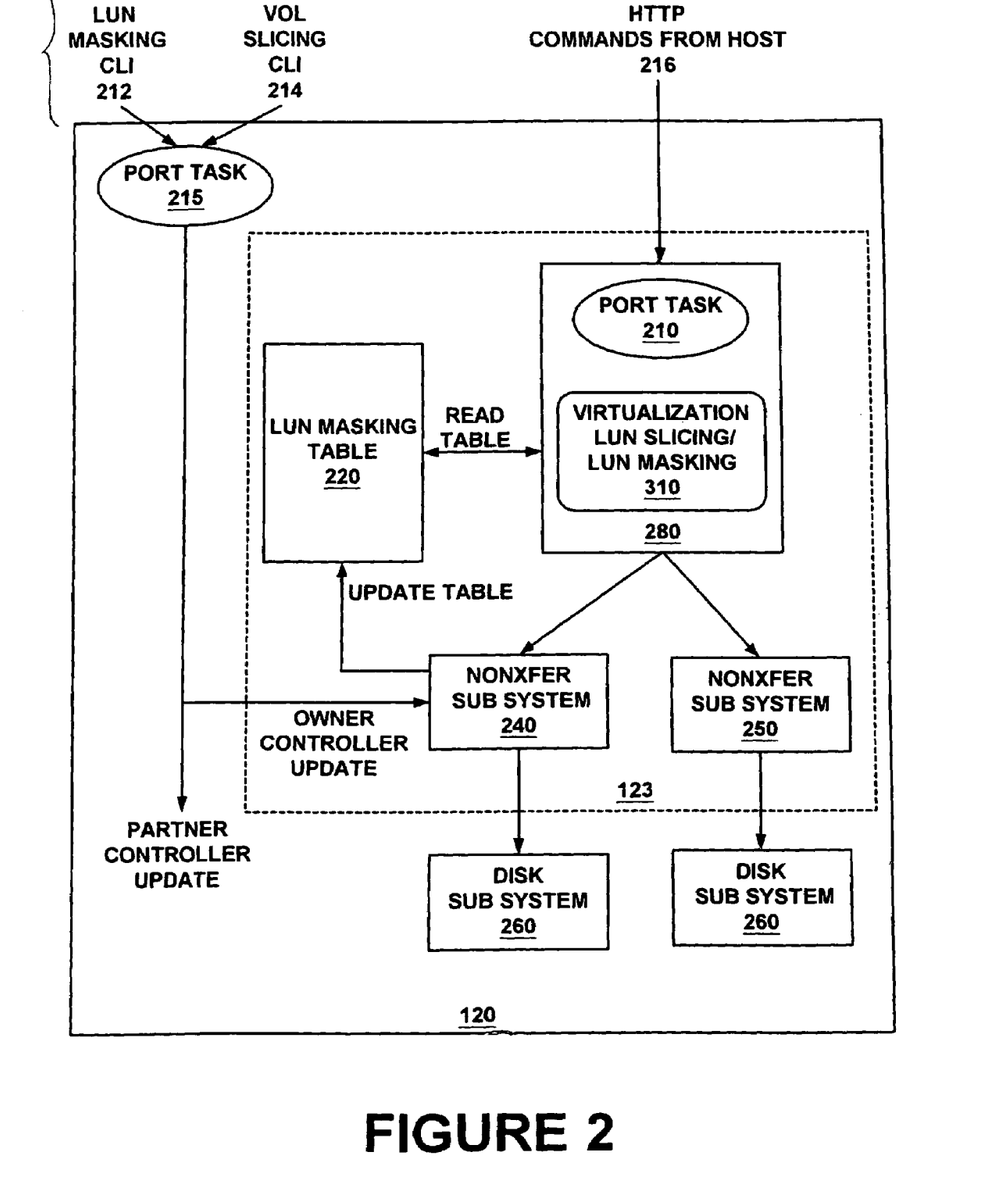
FIG. 2 illustrates a block diagram of an exemplary data storage system that is capable of recognizing virtually created data storage units, in accordance with one embodiment of the present invention.

The storage device 120 is comprised of various components including a storage subsystem 260 for storing data. For example, the storage subsystem 260 can comprise a plurality of disk drives, such as, disk subsystem 260 for storing data, in accordance with one embodiment of the present invention. The disk subsystem 260 can consist of any number of disk drives in one embodiment. Within the storage device 120, a disk interface 127 controls the flow of data to each of the disks within the disk subsystem 260. In one embodiment, storage device 120 includes a cache memory 129 for providing XOR redundancy of data within the disk subsystem 260. A network interface 123 provides interfacing between the host applications 110 through the network 190 and the storage device 120.

Moreover, embodiments of the present invention are comprised of computer-readable and computer-executable instructions which reside, for example, in computer-readable media of a computer system, such as, computer system 130 of FIG. 1. Computer system 130 can include exemplary embedded components including an internal address/data bus for communicating information, a central processor coupled with the bus for processing information and instructions, a volatile memory (e.g., random access memory (RAM), static RAM dynamic RAM, etc.) coupled with the bus for storing information and instructions for the central processor, and a non-volatile memory (e.g., read only memory (ROM), programmable ROM, flash memory, EPROM, EEPROM, etc.) coupled to the bus for storing static information and instructions for the processor. In one embodiment of the present invention, the computer system 130, through a virtualization software layer, creates a plurality of virtual storage units and provides translation for the plurality of virtual storage units with the existing volume or volumes in the disk subsystem 260.

Figure 4:
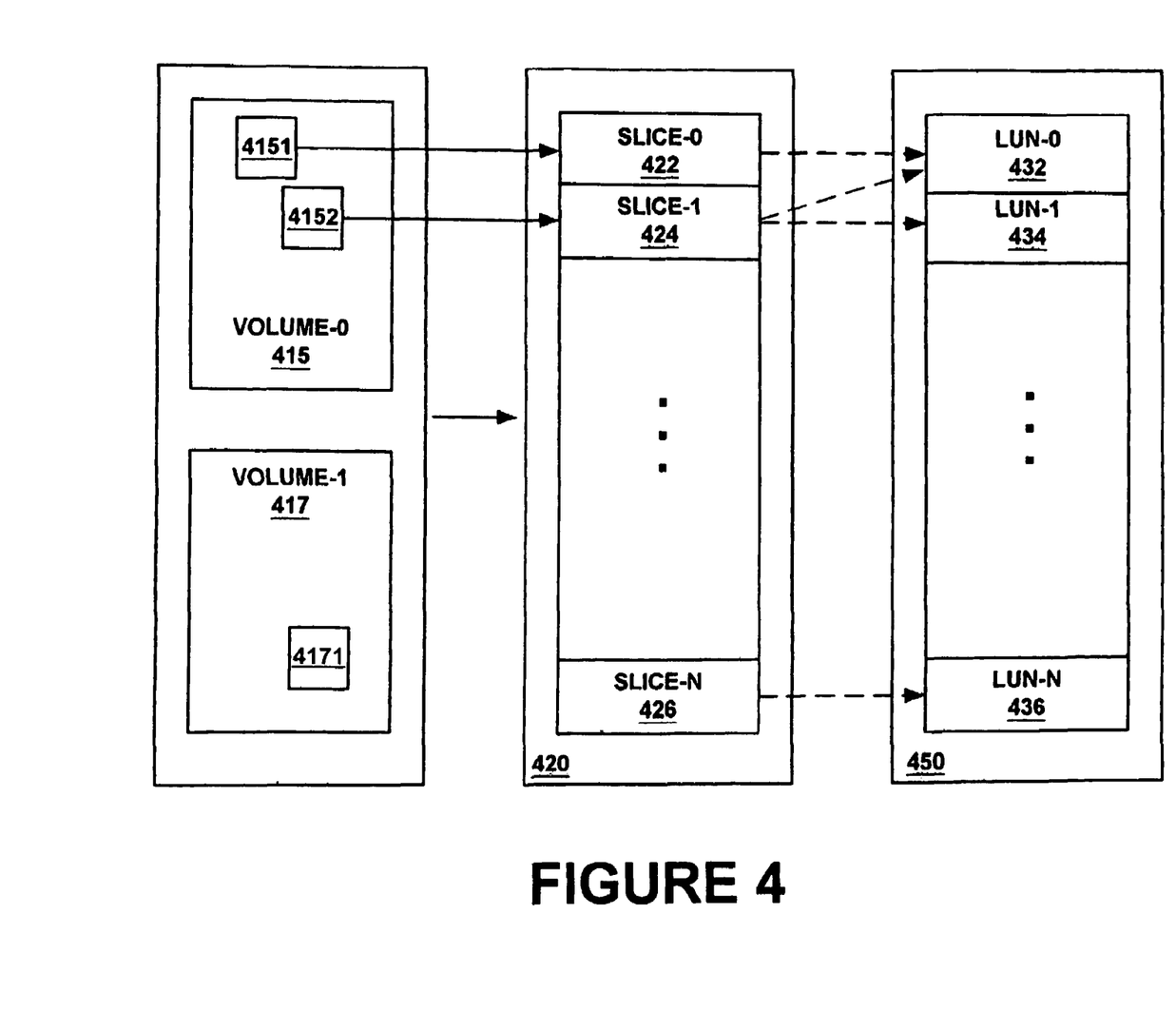
FIG. 4 is a block diagram illustrating the creation and mapping of an existing data storage device to a plurality of virtual data storage units, in accordance with one embodiment of the present invention.
Figure 5:
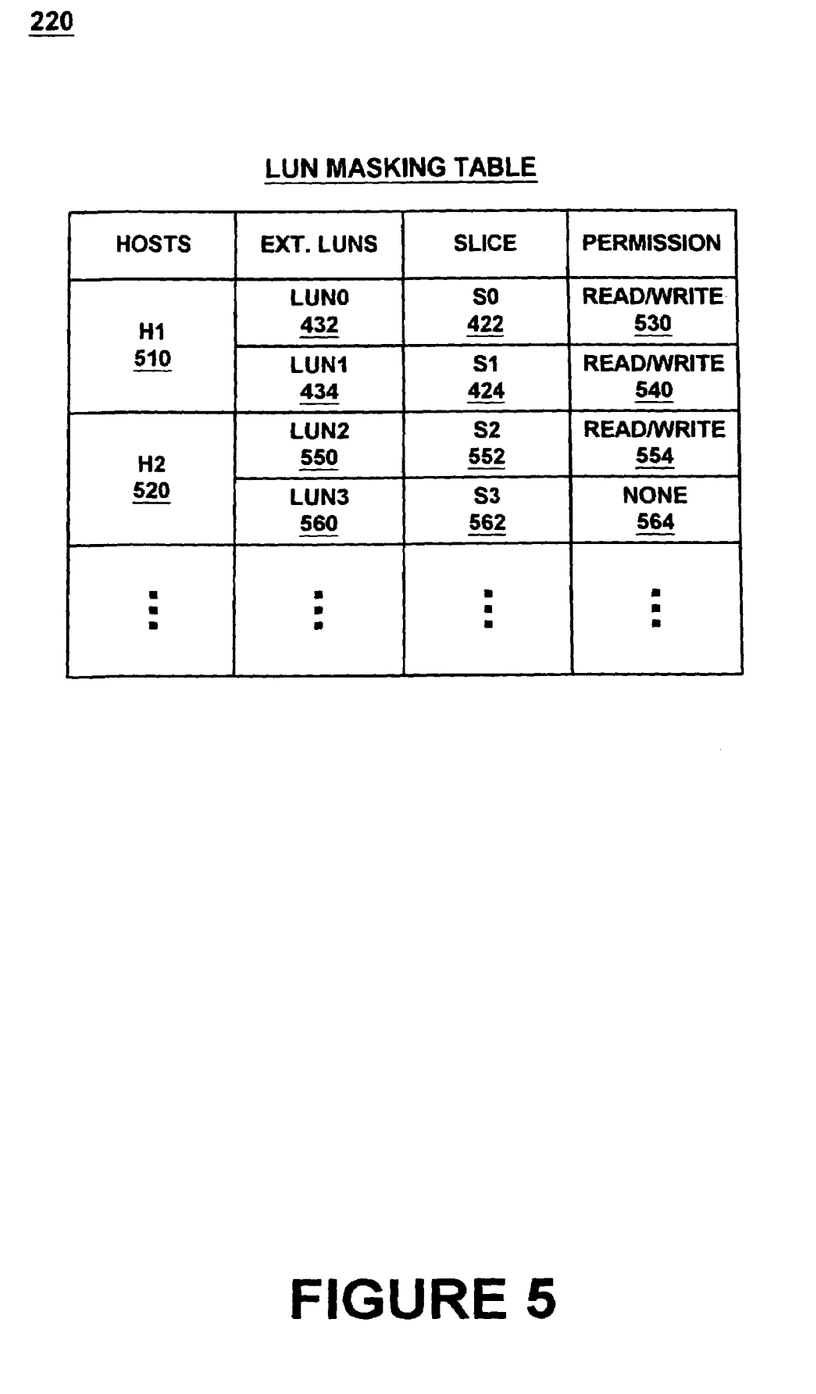
FIG. 5 is a masking table illustrating the access states for each of the host applications in relation to each of the plurality of virtual data storage units, in accordance with one embodiment of the present invention.
Figure 6:
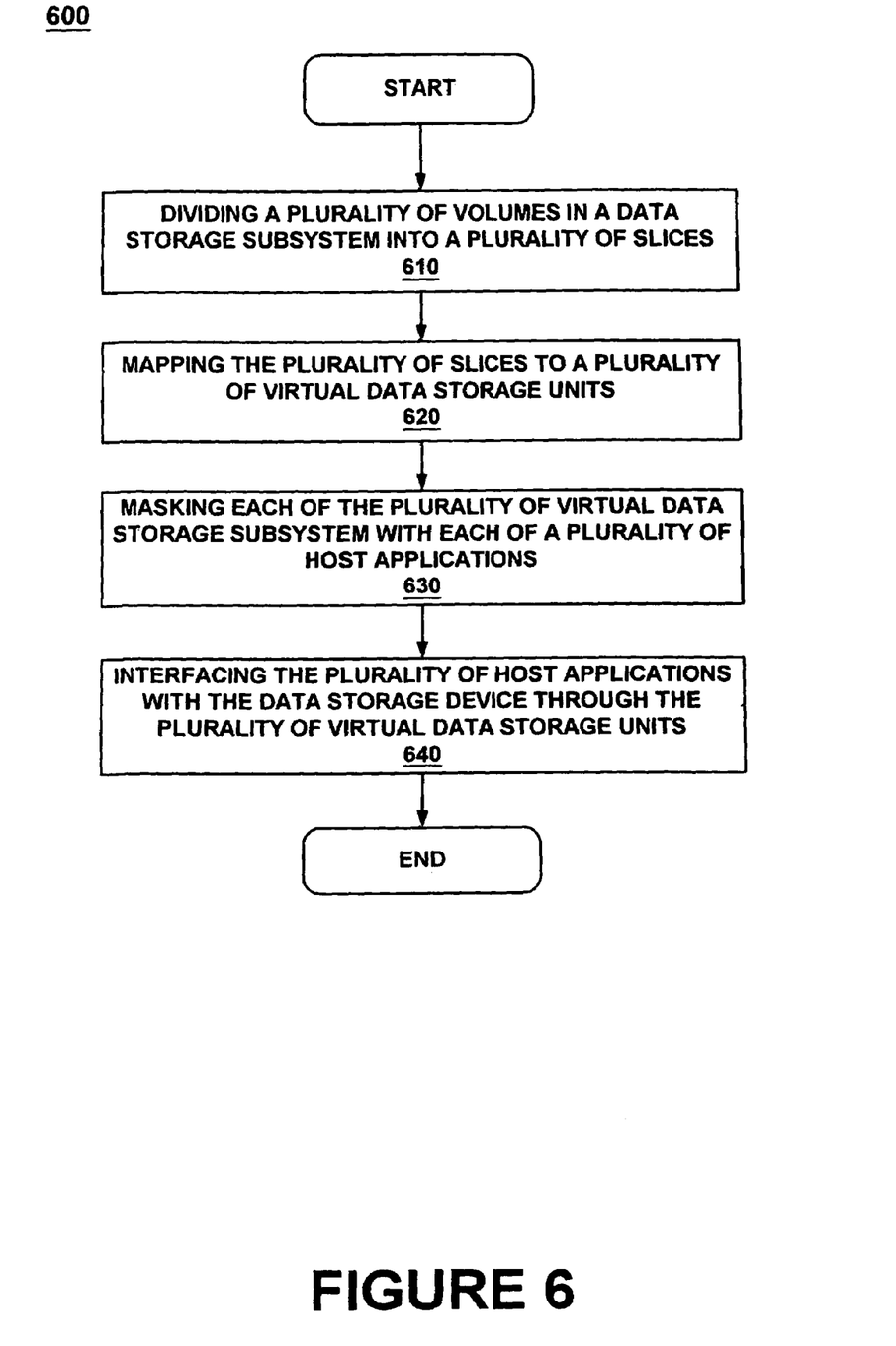
FIG. 6 is a flow chart illustrating steps in a method of data storage, in accordance with one embodiment of the present invention.

FIG. 6, in combination with FIGS. 2, 3, 4, 5, and 7 illustrates a flow chart of steps for a method of converting one or more volumes of storage in a data storage device into multiple virtual data storage units, in accordance with one embodiment of the present invention.

In essence, a plurality of virtual logical units of storage (virtual LUNs) are created from one or more existing volumes of storage in a storage device by the present embodiment. Each of the virtual LUNs are accessible by one or more host applications. Each of the host applications interact with each of the virtual LUNs following the same protocols used to interact with the volume or volumes of storage, such as, configuring the virtual LUN with the host application.

A virtualization layer (e.g., layer 310 of FIG. 3) that is a separate and additional software layer is used to interface with and preserve the originally configured internal intelligence (e.g., operating codes) for accessing the existing volume or volumes of storage. The virtualization layer 310 also acts with the network interface 123 for receiving I/O commands sent to the virtual LUNs. The virtualization layer 310 also provides for translating between the existing volumes of storage and the virtual LUNs.

Figure 3:
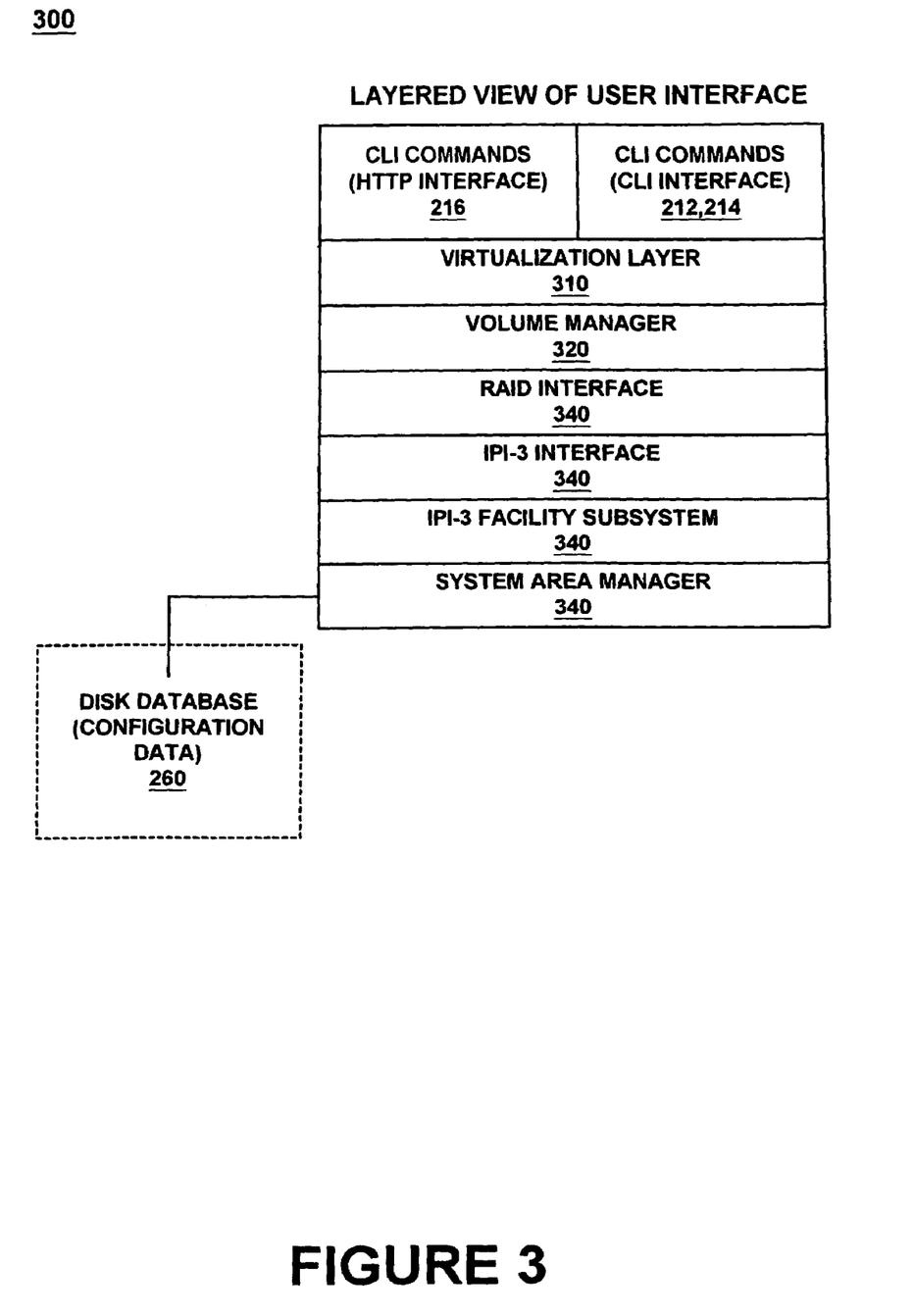
FIG. 3 illustrates a data flow diagram of a user interface for configuring a data storage device, in accordance with one embodiment of the present invention.

Without the benefit of the virtualization layer 310 of the present embodiment, the internal intelligence used for accessing the existing volume or volumes of storage would have to be rewritten to recognize and accommodate the virtual LUNs. This would require additional downtime and resources for troubleshooting the system errors inherent in implementing the rewritten code.

In some embodiments, the present invention allows a system, originally configured to provide access to a definite number of volumes of storage by a limited number of host applications, to address and access a greater number of virtual LUNs by a greater number of host applications.

In other embodiments, each of the volumes of storage and the virtual LUNs substantially comply with small computer system interface (SCSI) protocols. In other embodiments, other protocols, such as, for example Fibre Channel (FC) or Internet Protocol (IP) are possible.

Referring now to FIG. 2, the data storage device 120 of FIG. 1 is shown that provides for managing a plurality of virtual LUNs over one or more existing volumes of storage within the storage device 120, in accordance with one embodiment of the present invention. The data storage device 120 comprises two interfaces for receiving and sending command line interface (CLI) instructions and Input/Output (I/O) data. The interfaces include a CLI interface and a hypertext transfer protocol (HTTP) interface.

Typically, the CLI interface provides access by a user (e.g., system administrator) to configure, update, and/or modify the data storage device 120, such as, creating or removing virtual LUNs, and expanding or reducing the size of virtual LUNs, etc. In FIG. 2, the CLI interface is provided through port task 215 that functions essentially for properly routing the CLI instructions through storage device 120. In another embodiment, the HTTP interface, through port task 210, also allows access by a user to configure the storage device 120. In addition, the HTTP interface, through port task 210, provides for an avenue for access by other users and host applications to the data storage device 120, as will be discussed.

In FIG. 2, CLI instructions, through either port task 215 or 210, provides for LUN masking traffic 212 and volume slicing traffic 214 from a user to flow to the data storage device 120, in accordance with one embodiment of the present invention. For example, the volume slicing traffic 214 may contain a CLI instruction to reconfigure or update the data storage device 120 to increase the number of virtual LUNs by increasing the number of associated slices within the existing volumes of storage. The traffic 212 or 214 will travel from the port task 215 to the non-transfer subsystem 240 of the data storage network 200. From there, the disk subsystem 260 is updated to reflect the new configuration data. In addition, updates are made consistent with the masking 212 and slicing 214 traffic to the LUN masking table 220 and LUN to slice mapping table 230.

FIG. 3 is a flow diagram 300 illustrating the layered view of a user interface for configuring the data storage device 120, in accordance with one embodiment of the present invention. A virtualization layer 310 that provides for LUN virtualization can be layered above the existing internal protocols 340 of the data storage device 120 and the volume manager 320 that manages data flow to the existing volumes within the data storage device 120. In one embodiment, the protocols 340 can include the non-transfer subsystem 240 of FIG. 2. The virtualization layer 310 also contains the volume slicing and LUN masking functionalities that creates and manages the virtual LUNs that are located above the existing volume or volumes of storage corresponding to the disk subsystem 260 within the data storage device 120. As such, as a further function, the virtualization layer 310 provides for updating the LUN masking table 220 and LUN to slice mapping table 230 to the new configuration data.

In addition, within the data storage device 120, the configuration data can pass through the non transfer subsystem 240 in order to store the configuration data within the disk database 260, in accordance with one embodiment of the present invention.

The existing internal protocols of the protocol stack 340 as shown in FIG. 3 are exemplary only and include a redundant array of independent disks (RAID) interface, various IPI interfaces, and a system area manager interface for access to the disk database 260, in one embodiment.

Protocol stack 340 can also include the non-transfer subsystem 240 of FIG. 2, in one embodiment. Other embodiments are well suited to additional or different protocols within the protocol stack 310 of the data storage network.

Referring back to FIG. 2, access to the data storage device 120 is also provided through an HTTP interface in accordance with another embodiment of the present invention.

In FIG. 2, the HTTP interface provides for HTTP traffic 216 to communicate with the data storage device 120 through the LUN virtualization interface 280. The LUN virtualization interface 280 includes a port task 210 for routing signals and the virtualization layer 310 that provides for volume slicing and LUN masking. In one embodiment, the HTTP traffic 216 contains access traffic including read and write I/O commands from various host applications that are adaptively coupled, such as through a network 190 of FIG. 1, to the data storage device 120. As such, the HTTP traffic 216 flows down to the transfer subsystem 250 of the data storage device 120. From there, the HTTP traffic 216 is directed to the disk subsystem 260.

As discussed previously, in another embodiment, the HTTP traffic 216 can include configuration information as previously discussed in the CLI interface. In that case, the HTTP traffic 216 would flow to the non-transfer subsystem 240.

Figure 7:
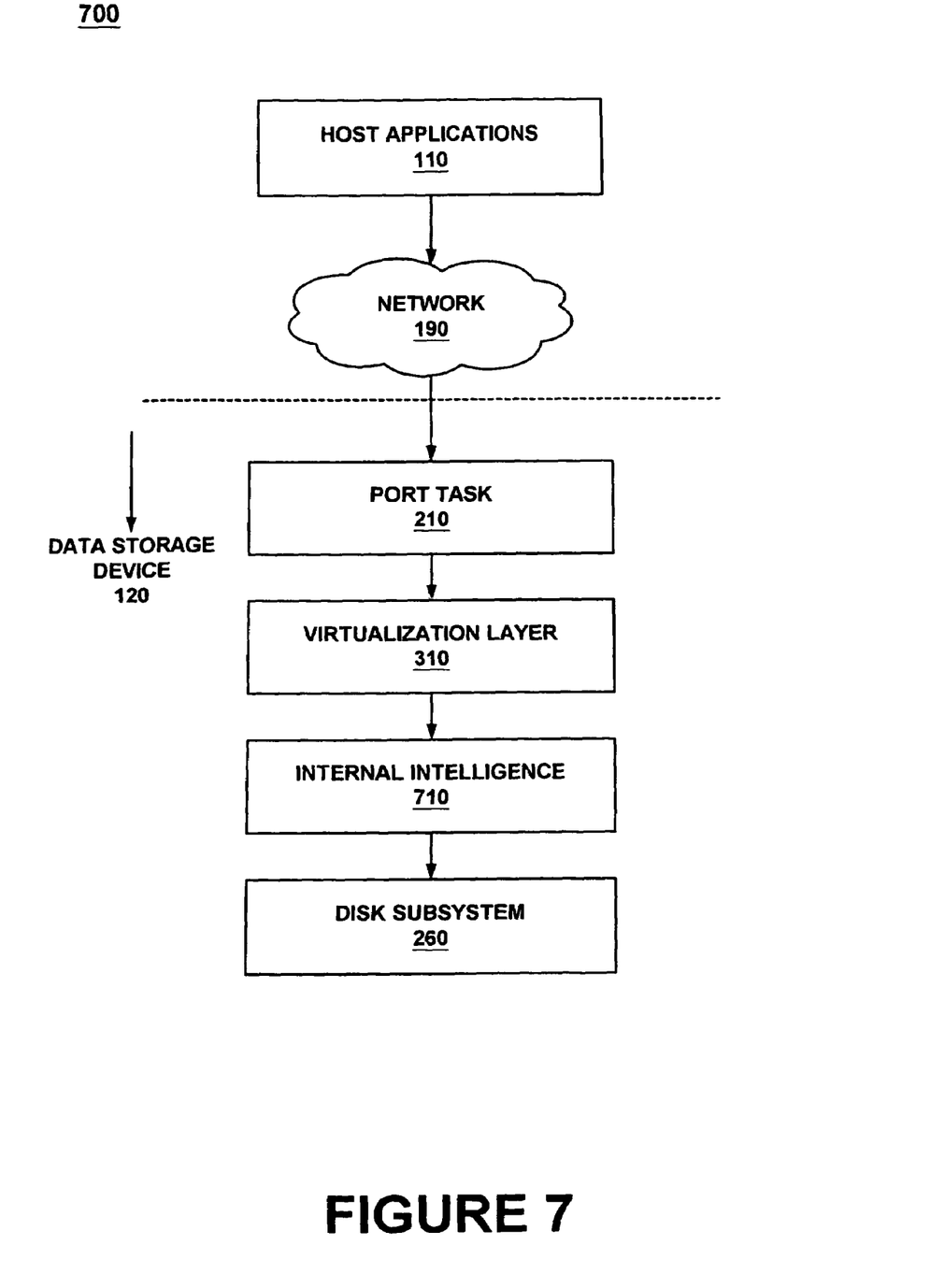
FIG. 7 illustrates a data flow diagram between host applications and an exemplary data storage device that is capable of recognizing virtually created data storage units, in accordance with one embodiment of the present invention.

Referring now to FIG. 7, the flow diagram 700 illustrates the layered view of a host interface for sending I/O commands 216 to the data storage device 120, in accordance with one embodiment of the present invention. One or more host applications 110, as shown in FIGS. 1 and 7, are coupled to the data storage device 120 through a network 190. The I/O commands 216 are received at the data storage device 120 through the network interface 123 via the LUN virtualization interface 280. The virtualization interface 280 contains a port task 210, for the routing of signals, and the virtualization layer 310, in one embodiment. For example, the port task 210 provides for proper routing of the I/O commands 216.

The virtualization layer 310 provides for transparently interfacing a plurality of host applications 110 with the existing volumes of storage through the virtual LUNs. Also, the virtualization layer 310 interfaces with the host applications to provide direct access to the virtual LUNs. The virtualization layer 310, independent from the host applications, translates between the virtual LUNs, the plurality of slices, and the existing volumes of storage to provide further access to the existing volumes of storage using the originally configured and unaltered internal intelligence (e.g., internal operating code).

Access to the existing volumes of storage is performed transparently to the host applications, such that the host applications are unaware of any transactions or communication with the existing volumes of storage within the data storage device 120. As such, the host applications only communicate with the virtualization layer 310 for access to the virtual LUNs. Furthermore, the host applications indirectly access the existing volumes of storage through the virtualization layer 310.

The virtualization layer 310 is located below the port task 210 and receives the I/O commands 216. In addition, the virtualization layer 310 is located above the internal intelligence layer 710 of the storage system 120. In one embodiment the internal intelligence layer 710 includes and/or works with the transfer subsystem 250 of FIG. 2 to store data into the disk subsystem 260. As discussed previously, the virtualization layer 310 creates and manages the virtual LUNs within the data storage device 120 (see FIG. 3).

In addition, the virtualization layer 310 interfaces the host applications 110 that access the virtual LUNs with the existing volumes of storage by translating between the virtual LUNs, the plurality of slices associated with the existing volumes, and the existing volume or volumes of storage corresponding to the disk subsystem 260 in the data storage device 120. In one embodiment, the virtualization layer 310 translates virtual addresses within the virtual LUN to a addresses within the existing volume or volumes in the data storage device 120.

The virtualization layer 310 interfaces with the existing volume or volumes of storage in the disk subsystem 260 to provide indirect access by the host applications to the volumes of storage within the data storage device 120. Each of the plurality of host applications 110 directly access a virtual LUN within the plurality of virtual LUNs via the virtualization layer 310, which then translates and routes data signals to and from the host application to the corresponding volume of storage. As such, the translation provides indirect access to the existing volumes of storage to the host applications 110 through the virtual LUNs. Thereafter, the I/O traffic 216 flows through the internal intelligence layer 250 and on to the disk subsystem 260.

The internal intelligence software layer 710 can include but is not limited to the internal transfer code that coordinates the transfer of data, the monitoring code that monitors failures within the data storage system, and the driver code for coordinating communication between the data storage network and the host application. The internal intelligence software layer 710 can also include and/or work with the transfer subsystem 250 in order to store data into the disk subsystem 260.

Because the virtualization layer 310 provides an interface between the host applications and the existing volumes of storage in the disk subsystem 260, the internal intelligence 710 layer is transparent to the transactions between the volume manager and the host applications, and thus is not affected by the various mappings and translations carried out. As such, the virtualization layer 310 can interface with the originally configured internal intelligence layer 710 that accesses the disk database 260, such as, the internal operating code (e.g., transfer code, monitoring code, driver code, etc.)

Further, the originally configured internal intelligence layer 710 need not be rewritten, updated, or altered to accommodate the plurality of virtual volumes 265, which significantly reduces the risk of system errors. Without the benefit of the virtualization layer 310 of the present invention, the internal intelligence layer 710 would have to be rewritten to recognize and accommodate the plurality of virtual volumes 265. In that case, additional downtime for testing of the rewritten internal intelligence layer 710 would be necessary for troubleshooting the system errors inherent in implementing new rewritten code.

On the other hand, implementation of embodiments of the present invention with existing volumes of storage can occur with minimal testing mainly because the existing internal intelligence layer 710 is not altered. Moreover, the virtualization layer 310 does not alter the existing internal volume configurations. In essence, the virtualization layer 310 maps back to the internal operating code (e.g., internal intelligence 710) and the existing internal volume configurations in the data storage device 120.

Referring now to FIG. 6, the creation of a plurality of virtual data storage units (e.g., virtual LUNs) from one or more volumes of storage within a data storage device is accomplished by volume slicing, LUN mapping, and LUN masking in accordance with one embodiment of the present invention. The present embodiment divides or slices the volume or volumes of storage into a plurality of slices in step 610. The mechanism for accomplishing volume slicing is included within the virtualization layer 310, and as such, is added as a layer on top of the existing internal operating code 710 for accessing the volumes of storage within the data storage device.

The present embodiment converts an existing data storage device that has a 1:1 volume to LUN ratio accessible by one or more host applications into a data storage unit that has a 1:N volume to LUN ratio. Volume slicing provides the ability to partition a volume into variably sized slices which correspond to a virtual LUN. This provides connected host applications with multiple virtual LUNs per volume. As such, one or more volumes within a data storage device would have "N" virtual LUNs available to a plurality of host applications adaptively coupled to the data storage device, in accordance with one embodiment of the present invention. Volume slicing allows for data storage networks to take advantage of the ever increasing drive sizes of data disks.

For example, referring now to FIG. 4, an exemplary and existing data storage device 410 is shown to be divided into two existing volumes, volume-0 415 and volume-1 417. The data storage device 410 comprises a plurality of disk drives in one embodiment. Each of the volumes 415 and 417 can contain varying numbers of disk drives, in another embodiment. Previously, host applications would access each of the volumes in their entirety. As such, in a two volume device, the device could only effectively support the two volumes no matter the size of the volumes. FIG. 4 is exemplary only, and embodiments of the present invention include data storage devices that are divided into one or more volumes.

Volume slicing divides each of the volume or volumes (415 and 417) in the data storage device 410 into a plurality of slices. As such, the data storage device 410 is divided into a plurality of slices 420. Within the process of volume slicing, each of the slices in the plurality of slices 420 correspond to a known physical space within the volumes 415 and 417. FIG. 4 shows that volume-0 415 and volume-1 417 are divided into N slices: slice-0 422, slice-1 424, on up to slice-N 426. Moreover, slice-0 422 corresponds to physical space 4151 within volume-0 415, slice-1 424 corresponds to physical space 4152 within volume-0 415, and slice-N 426 corresponds to physical space 4171 within volume-1 417.

In addition, volume slicing can provide for the scaling of each of the slices within a volume to suit particular applications. For example, a 20 Gbyte volume can be configured in numerous ways, such as: ten 2 Gbyte slices; five 4 Gbyte slices; five 2 Gbyte slices, and two 5 Gbyte slices; etc.

In one embodiment, a slice number is assigned to each slice as it is created in the order of creation. In another embodiment, the size of the slice is aligned to the stripe boundary, where the stripe boundary comprises units of storage across all the disks within the data storage system. For example, if the minimum size of the slice is equal to 1 Gbyte, but the stripe boundary across all of the disks within the data storage device is larger than 1 Gbyte, then the minimum size of the slice is aligned to the stripe boundary. Moreover, the stripe size and the maximum size of the slice depend on the maximum size of the volumes within the data storage device. In addition, in another embodiment, the entire space in a volume of storage need not be used or converted to a virtual LUN. In still another embodiment, an SCSI address or world wide name (WWN) is generated for each of the plurality of slices and/or each of the plurality of virtual LUNs using existing addressing techniques.

Returning now back to FIG. 6, a mapping between each of the plurality of slices 420 to a corresponding virtual LUN within a plurality of virtual LUNs 450 managed by the virtualization layer 310 occurs in step 620. In this way, one or more volumes in a data storage device can be divided into 'N' virtual LUNs. In one embodiment, a mapping table (e.g., mapping table 230 of FIG. 2) is created that maps each of the plurality of slices to a virtual LUN. This mapping table provides the basis for the virtualization of data storage device.

In particular, slice-0 422 is mapped to virtual LUN-0 432, slice-1 424 is mapped to virtual LUN-1 434, and so on until each of the slices in the plurality of slices 420 is mapped to a virtual LUN in the plurality of virtual LUNs 450 (e.g., slice-N 426 to virtual LUN-N 436).

In one embodiment, each of the slices are automatically mapped on a 1:1 basis to a virtual LUN with the plurality of LUNs. In another embodiment, a user can define to which virtual LUN a particular slice corresponds. In still another embodiment, LUN expansion is provided, whereby two or more slices within the plurality of slices (e.g. plurality of slices 420) are assigned to one virtual LUN. In still another embodiment, LUN virtualization is provided, whereby two or more virtual LUNs correspond to a single slice within the plurality of slices. In that case, proper control of the virtual LUNs would need to be exercised so that no more than one host application could write to the single slice, although more than one host application could read the slice.

Returning now back to FIG. 6, masking for each of the plurality of virtual data storage units or virtual LUNs occurs in step 630, in accordance with one embodiment of the present invention. In one embodiment, the mechanism for accomplishing masking is included within the virtualization layer 310 that includes volume slicing and LUN masking functionalities, and as such, is added as a layer on top of the existing protocol stack or internal intelligence (e.g., internal intelligence 710). Masking sets up access permissions for each of a plurality of host applications with each of the virtual LUNs that are managed and created within the data storage device 120. Access permissions include full read and write access, partial access, or blocking of access.

FIG. 5 illustrates an exemplary masking table 220 for a plurality of virtual LUNs in a data storage device. Table 220 includes the mapping of each of the plurality of virtual LUNs to a slice within one or more volumes of storage. As discussed above, virtual LUN-0 432 is shown to be mapped to slice-0 422 and virtual LUN-1 434 is shown to be mapped to slice 1 424. In addition, the masking table 220 shows that virtual LUN-2 550 is mapped to slice-2 552 and virtual LUN 3 560 is mapped to slice-3 562.

Returning back to step 630 of FIG. 6, masking includes determining access states for each of the plurality of virtual LUNs with regards to each of the plurality of host applications adaptively coupled to the data storage device, in accordance with one embodiment of the present invention. Providing the masking capability allows the coordination for more than one host to write to the same volume of storage without any data loss. The ability to mask particular physical spaces within an existing volume becomes increasingly important as more and more host applications gain access to a particular data storage device and/or a storage network and an associated system area network.

The masking of virtual LUNs works to prevent host applications from accessing virtual LUNs that they are coupled to but are denied access. This allows multiple host applications to communicate with and access a data storage network without interference with each other's storage capability. As such, security is provided in one embodiment as each incoming I/O request can be checked to verify that it is coming from a host application that has the requisite permission for access to the address or space of the existing volume of storage required.

Referring now back to FIG. 5, the masking table 220 provides a list of access permissions that defines access states for each of the plurality of host applications adaptively coupled to a data storage device and the plurality of virtual data storage units (virtual LUNs) supported by that data storage network. For example, masking table 220 shows the access states for the two host applications, host applications 510 and 520.

In particular, permission information for host application 510 is provided. In masking table 220, host application 510 has access to virtual LUN-0 432 and has read/write access to corresponding slice-0 422, which corresponds to a physical space in the existing volume of storage, as defined in permission entry 530. Similarly, host application 510 has access to virtual LUN-1 434 and has read/write access to slice-1 424, which corresponds to a physical space in the existing volume of storage, as defined in permission entry 540.

Continuing with masking table 220, permission information for host application 520 is also provided. In masking table 220, host application 520 has access to virtual LUN-2 550 and has read/write access to slice-2 552, which corresponds to a physical space in the existing volume, as defined in permission entry 554. Similarly, table 220 provides no access for host application 520 to virtual LUN-3 560 and its corresponding slice-3 562, as determined in entry 564.

Table 220 is exemplary only and includes many more entries to completely map each of the plurality of virtual LUNs to each of the slices within an existing volume in a data storage device. Furthermore, table 220 includes many more entries to completely define access states for each of the plurality of virtual LUNs in relation to the plurality of host applications.

Returning now back to FIG. 6, interfacing the plurality of host applications with the existing volume of storage through the plurality of virtual LUNs is provided, in accordance with one embodiment of the present invention. By combining the information obtained within the mapping table 230 and the masking table 220, the virtualization of LUNs within a data storage network is possible. As such, every virtual LUN is capable of being mapped to one or more volume slices, and in turn, translated into a physical space within the corresponding existing data storage unit. In essence, every virtual address in a virtual LUN has a translated and corresponding physical address in the existing volume of storage.

The virtualization layer 310 transparently provides the interfacing between the host applications, virtual data storage units (virtual LUNs), and the existing volume of storage. As such, the host applications are unaware of the volume or volumes of storage behind the virtual LUNs that they communicate with, and conversely, the transfer system of the existing volume is unaware of the virtual LUNs that are presented to the host applications.

While the methods of embodiments illustrated in flow chart 600 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, slicing an existing logical unit of storage into a plurality of virtual logical units of storage, is thus described. While the present invention has been described in particular embodiments, it should be appreciated that the present invention should not be construed as limited by such embodiments, but rather construed according to the below claims.

What is claimed is:

1. A computer storage system comprising:
a storage subsystem storing data for a plurality of hosts comprising a plurality of existing volumes;
a plurality of slices within said plurality of existing volumes;
an originally configured internal intelligence software layer interfacing with said plurality of existing volumes;
a plurality of virtual data storage units wherein at least a slice within said plurality of existing volumes is mapped to more than one virtual data storage unit; and
a virtualization software layer that uses at least one unaltered internal operating code to interface with said originally configured internal intelligence software layer to enable one of said plurality of hosts to access said plurality of existing volumes via more than one of said virtual data storage units by mapping between said more than one virtual data storage units, said plurality of slices, and said plurality of existing volumes.

2. The computer storage system as described in claim 1, wherein said virtualization software layer creates and manages said plurality of virtual data storage units.

3. The computer storage system as described in claim 1, wherein said storage subsystem comprises a plurality of disk drives.

4. The computer storage system as described in claim 1, wherein said plurality of hosts directly access said plurality of virtual data storage units.

5. The computer storage system as described in claim 4, further comprising a masking table for masking each of said plurality of host applications with each of said plurality of virtual data storage units for access control.

6. The computer storage system as described in claim 1 wherein each of said plurality of virtual data storage units is a logical unit (LUN) of storage.

7. The computer storage system as described in claim 6, wherein said LUN implements small computer interface (SCSI) protocols.

8. The computer storage system as described in claim 1, further comprising a mapping table for mapping between said plurality of slices and said plurality of virtual data storage units.

9. A method of data storage, comprising:
a) dividing a plurality of existing volumes from a storage subsystem into a plurality of slices, said existing volumes accessed by host applications using a protocol;
b) mapping at least one of said plurality of slices to a plurality of virtual data storage units;
c) interfacing a host application, directly accessing said plurality of virtual data storage units, with said plurality of existing volumes using an unaltered internal operating code of said protocol such that the interfacing is transparent to the host application.

10. The method of data storage as described in claim 9, wherein c) comprises
transparently interfacing said host application with said plurality of existing volumes by translating between said plurality of virtual data storage units, said plurality of slices, and said plurality of existing volumes.

11. The method of data storage as described in claim 9, wherein c) comprises:
translating a virtual address associated with said plurality of virtual data storage units to a corresponding address in said plurality of existing volumes.

12. The method of data storage as described in claim 9, further comprising:
d) masking a plurality of host applications with said plurality of virtual data storage units for access control.

13. The method of data storage as described in claim 12, wherein d) comprises:
determining access states for each of said plurality of virtual data storage units in relation to each of said plurality of host applications.

14. The method of data storage as described in claim 9, wherein each of said plurality of virtual data storage units is a logical unit (LUN) of storage.

15. The method of data storage as described in claim 9, wherein each of said plurality of virtual data storage units implements small computer system interface (SCSI) protocols.

16. The method of data storage as described in claim 12, further comprising:
allowing updates to said mapping of said plurality of slices to said plurality of virtual data storage units; and
allowing updates to said masking of each of the plurality of host applications with said plurality of virtual data storage units.

17. A method of data storage, comprising:
a) partitioning a storage subsystem into a plurality of slices, said storage subsystem accessed by host applications using a protocol;

b) mapping each of a plurality of virtual data storage units to respective slices in said plurality of slices; and c) transparently interfacing a host application with said storage subsystem such that said host application can indirectly access said storage subsystem using an unaltered internal operating code of said protocol by directly accessing more than one virtual data storage unit of said plurality of virtual data storage units.

18. The method of data storage as described in claim 17, wherein a) comprises:

assigning a world wide name to each of said plurality of slices, said world wide name complying with small computer system interface (SCSI) protocols.

19. The method of data storage as described in claim 17, further comprising:

d) masking a plurality of host applications with said plurality of virtual data storage units.

20. The method of data storage as described in claim 19, wherein d) comprises:

determining access states for each of said plurality of host applications in relation to each of said plurality of virtual data storage units for controlling access to said storage subsystem.

21. The method of data storage as described in claim 17, wherein c) comprises:

translating a virtual address associated with said more than one virtual data storage unit of said plurality of virtual data storage units to a corresponding address in said storage subsystem.

22. The method of data storage as described in claim 17, wherein each of said virtual data storage units is a logical unit (LUN) of storage implementing small computer system interface (SCSI) protocols.

23. A computer system comprising:

a processor; and a computer readable memory coupled to said processor and containing program instructions that, when executed, implement a method of data storage, comprising:

a) dividing a plurality of existing volumes from a storage subsystem into a plurality of slices, said existing volumes accessed by host applications using a protocol;

b) mapping at least one of said plurality of slices to a plurality of virtual data storage units;

c) interfacing a host application, directly accessing more than one of said virtual data storage units, with said plurality of existing volumes using an unaltered internal operating code of said protocol such that the interfacing is transparent to the host application.

24. The method of data storage as described in claim 23, wherein c) comprises:

transparently interfacing said host application with said plurality of existing volumes by translating between said plurality of virtual data storage units, said plurality of slices, and said plurality of existing volumes.

25. The method of data storage as described in claim 23, wherein c) comprises:

translating a virtual address associated with said plurality of virtual data storage units to a corresponding address in said plurality of existing volumes.

26. The method of data storage as described in claim 23, further comprising:

d) masking a plurality of host applications with said plurality of virtual data storage units for access control.

27. The method of data storage as described in claim 26, wherein d) comprises:

determining access states for each of said plurality of virtual data storage units in relation to each of said plurality of host applications.

28. The method of data storage as described in claim 23, wherein each of said plurality of virtual data storage units is a logical unit (LUN) of storage.

29. The method of data storage as described in claim 23, wherein each of said plurality of virtual data storage units implements small computer system interface (SCSI) protocols.

30. The method of data storage as described in claim 26, further comprising:

allowing updates to said mapping of said plurality of slices to said plurality of virtual data storage units; and allowing updates to said masking of each of the plurality of host applications with said plurality of virtual data storage units.

31. A method of providing data storage, comprising:

dividing each of a plurality of physical storage devices into slices;

mapping at least a slice to a plurality of virtual data storage units;

providing a host application with direct access to more than one of the virtual data storage units; and configuring a virtualization layer that uses at least one unaltered internal operating code to interface with an originally configured internal intelligence software layer to enable the host application to indirectly access the slices by directly accessing the more than one of the virtual data storage units.

32. The method of claim 31, wherein the providing further includes:

providing the host application with direct access to the more than one of the virtual data storage units using commands previously used by the host application to directly access one of the plurality of physical storage devices.

33. The method of claim 31, wherein the slices vary in size depending on storage needs of the host application.

34. The method of claim 31, further comprising:

enabling a plurality of host applications to access the plurality of virtual data storage units by establishing an access permission for each of the plurality of host applications.

35. The method of claim 31, further comprising:

enabling a plurality of host applications to access the plurality of virtual data storage units by establishing an access permission for each of the plurality of virtual data storage units.

* * * * *